United States Patent
Hsu (10) Patent No.: US 8,718,459 B2
(45) Date of Patent: May 6, 2014

(54) METHOD AND DIGITAL CAMERA HAVING IMPROVED AUTOFOCUS

(75) Inventor: Cheng-Sheng Hsu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/486,021

(22) Filed: Jun. 1, 2012

(65) Prior Publication Data

US 2013/0322862 A1 Dec. 5, 2013

(51) Int. Cl.
*G03B 13/36* (2006.01)
*G02B 7/28* (2006.01)
*G02B 7/38* (2006.01)

(52) U.S. Cl.
CPC . *G02B 7/285* (2013.01); *G02B 7/38* (2013.01)
USPC .............................. 396/121; 396/133; 396/127

(58) Field of Classification Search
CPC .......... G03B 13/36; G02B 7/285; G02B 7/36; G02B 7/38; H04N 5/23212
USPC ................ 396/125, 127, 79, 80, 89; 348/345, 348/353–356
See application file for complete search history.

(56) References Cited

U.S. PATENT DOCUMENTS

| | | |
|---|---|---|
| 2003/0160886 A1 | 8/2003 | Misawa et al. |
| 2006/0275025 A1* | 12/2006 | Labaziewicz et al. .......... 396/72 |
| 2008/0218612 A1 | 9/2008 | Border et al. |
| 2008/0219654 A1* | 9/2008 | Border et al. ................... 396/89 |
| 2008/0316300 A1* | 12/2008 | Okamoto ........................ 348/47 |
| 2011/0012998 A1* | 1/2011 | Pan ................................ 348/47 |
| 2011/0150446 A1* | 6/2011 | Song ............................... 396/90 |

OTHER PUBLICATIONS

European Patent Office, "Extended European Search Report" for EP Application No. 12170430.8; dated Oct. 9, 2012.

* cited by examiner

*Primary Examiner* — William Perkey
(74) *Attorney, Agent, or Firm* — Ridout & Maybee LLP (57) ABSTRACT

The present disclosure provides a multi-lens device and method having improved autofocus. The method comprises: determining from a first focus value and second focus value whether a focus distance of a first lens or a focus distance of a second lens corresponds to a peak focus position; and adjusting the focus distance of the first lens and second lens when neither the focus distance of the first lens nor the focus distance of the second lens corresponds to the peak focus position.

20 Claims, 4 Drawing Sheets

METHOD AND DIGITAL CAMERA HAVING IMPROVED AUTOFOCUS

TECHNICAL FIELD

The present disclosure relates to digital cameras, and more particularly to a method and digital cameras having improved autofocus.

BACKGROUND

Digital cameras, including digital cameras built into smartphones and other multipurpose portable electronic devices, are sometimes provided with autofocus functionality. In common autofocus methods, the camera makes incremental changes to the focus distance of a lens until a focus point is found. Sometimes these incremental changes move the focus distance away from the focus point increasing the focussing time and increasing the power and motor usage of the device. Sometimes when the current focal distance is far from the focus point, the incremental nature of the autofocus results in long focussing times. Accordingly, there remains a need for improved autofocus methods and devices.

DETAILED DESCRIPTION

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently.

In accordance with one example embodiment, there is provided a method for autofocusing on a portable electronic device, the method comprising: determining a first focus value from image data captured by a first image sensor associated with the first lens; determining a second focus value from image data captured by a second image sensor associated with the second lens; determining from the first focus value and second focus value whether a focus distance of the first lens or a focus distance of the second lens corresponds to a peak focus position; and adjusting the focus distance of the first lens and second lens when neither the focus distance of the first lens nor the focus distance of the second lens corresponds to the peak focus position.

In accordance with another example embodiment, there is provided an electronic device, comprising: a first lens and a first focus adjuster for adjusting a focus distance of the first lens; a second lens and second focus adjuster for adjusting a focus distance of the second lens; at least one image sensor for detecting light received from the first and the second lenses; a processor coupled to the at least one image sensor and configured for performing the method(s) set forth herein.

In accordance with a further embodiment of the present disclosure, there is provided a computer program product comprising a (non-transitory) computer-readable storage medium having stored thereon computer program instructions for implementing a method on an electronic device, the computer executable instructions comprising instructions for performing the method(s) set forth herein.

Figure 1:
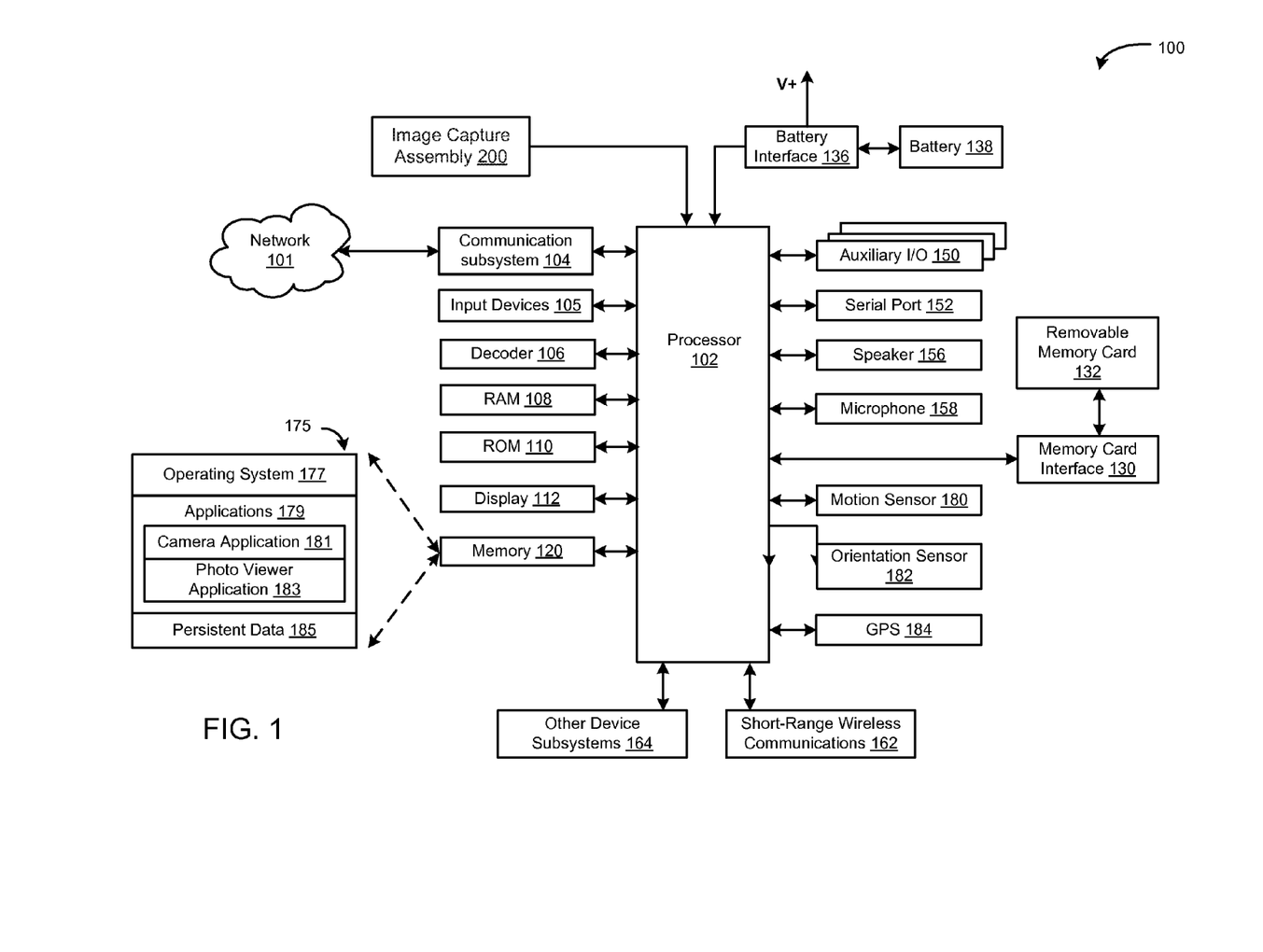
FIG. 1 is a block diagram illustrating a portable electronic device suitable for carrying out example embodiments of the present disclosure.

Reference is first made to FIG. 1 which illustrates a portable electronic device 100 (referred to hereinafter as merely electronic device 100 for convenience) in which example embodiments described in the present disclosure can be applied. The electronic device 100 described below has wireless communication capabilities; however, it is contemplated that the teachings of the present disclosure may be applied to devices without wireless communication capabilities. Examples of the electronic device 100 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera (which may be capable of both still image and video image capture).

The electronic device 100 includes a rigid case (not shown) housing the electronic components of the electronic device 100. The electronic components of the electronic device 100 are mounted on a printed circuit board (not shown). The electronic device 100 includes a controller comprising at least one processor 102 (such as a microprocessor) which controls the overall operation of the electronic device 100. Communication functions, including data and voice communications, are performed through a communication subsystem 104. Data received by the electronic device 100 may be decompressed and decrypted by a decoder 106. The communication subsystem 104 receives messages from and sends messages to a wireless network 101. The wireless network 101 may be any suitable type of wireless network.

The processor 102 interacts with other components, such as one or more input devices 105, Random Access Memory (RAM) 108, Read Only Memory (ROM) 110, a display 112 such as a colour liquid crystal display (LCD), persistent (non-volatile) memory 120 which may be flash erasable programmable read only memory (EPROM) memory ("flash memory") or any other suitable form of memory, an image capture assembly 200, a motion sensor 180 which enables the processor 102 to determine whether the electronic device 100 is in motion and the nature of any sensed motion at any appropriate time, e.g., when an image is captured, an orientation sensor 182 which enables the processor 102 to determine which direction the electronic device 100 is pointed at any appropriate time, e.g., when an image is captured, global positioning system (GPS) device 184 which enables the processor 102 to determine GPS coordinates (i.e., location) of the electronic device 100 at any appropriate time, e.g., when an image is captured, auxiliary input/output (I/O) subsystems 150, data port 152 such as serial data port (e.g., Universal Serial Bus (USB) data port), speaker 156, microphone 158, short-range communication subsystem 162, and other device subsystems generally designated as 164. The components of the electronic device 100 are coupled via a communications bus (not shown) which provides a communication path between the various components.

The display 112 typically includes a display area in which information may be displayed and a non-display area extending around the periphery of the display area. Information is not displayed in the non-display area. The non-display area may be utilized to accommodate, for example, electronic traces or electrical connections, adhesives or other sealants, and/or protective coatings around the edges of the display area.

The display 112 may be provided as part of a touch-sensitive display which provides an input device 105. The display 112 which together with a touch-sensitive overlay (not shown) operably coupled to an electronic controller (not shown) comprise the touch-sensitive display. The touch-sensitive display is typically a capacitive touch-sensitive display which includes a capacitive touch-sensitive overlay may be any other suitable touch-sensitive display, such as a resistive, infrared, surface acoustic wave (SAW) touch-sensitive display, strain gauge, optical imaging, dispersive signal technology, acoustic pulse recognition, and so forth, as known in the art. The overlay of the touch-sensitive display may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

User-interaction with the GUI is performed through the input devices 105. Information, such as text, characters, symbols, images, icons, and other items are rendered and displayed on the display 112 via the processor 102. The processor 102 may interact with the orientation sensor to detect direction of gravitational forces or gravity-induced reaction forces so as to determine, for example, the orientation of the electronic device 100 in order to determine a screen orientation for the GUI.

The input devices 105 may include a keyboard, control buttons such as a power toggle (on/off) button (not shown), a camera button (not shown) for enabling a camera mode, a capture button (not shown) for enabling an image capture sequence when in the camera mode, one or more zoom buttons (not shown) for enabling a selection of a zoom setting when in the camera mode, and a navigation device (not shown) for navigating through stored data, such as digital images, menu choices and the like which are displayed on the display 112. When the display 112 is provided as part of a touch-sensitive display, the capture button, zoom button and other camera controls may be provided by onscreen user interface elements displayed on the display 112 instead of, or in addition to, physical interface components. The keyboard may be provided instead of, or in addition to, a touch-sensitive display depending on the embodiment. At least some of the control buttons may be multi-purpose buttons rather than special purpose or dedicated buttons.

The electronic device 100 also includes a memory card interface 130 for receiving a removable memory card 132 comprising persistent memory, such as flash memory. A removable memory card 132 can be inserted in or coupled to the memory card interface 130 for storing and reading data by the processor 102 including, but not limited to still images and optionally video images captured by the image capture assembly 200. Other types of user data may also be stored on the removable memory card 132. Other types of removable digital image storage media, such as magnetic hard drives, magnetic tape, or optical disks, may be used in addition to, or instead of, the removable memory card 132.

The processor 102 operates under stored program control and executes software modules 175 stored in memory, for example, in the persistent memory 120. As illustrated in FIG. 1, the software modules 175 comprise operating system software 177 and software applications 179. The software applications 179 include a camera application 181 and photo viewer application 183. The camera application 181 contains the logic for operating the image capture assembly 200 and capturing still images and optionally video images from the image capture assembly 200 and storing the still images and video images in the persistent memory 120. The photo viewer application 183 contains logic for displaying data (i.e., still images and optionally video images) from the persistent memory 120 and data from the image capture assembly 200 on the display 112. Persistent data 185, such as user data, can also be stored in the persistent memory 120. The persistent data 185 may include digital media files stored in the electronic device 100 such as still images and/or video images captured by the image capture assembly 200, or other still images and/or video images transferred, downloaded or otherwise stored in the persistent memory 120.

The software modules 175 or parts thereof may be temporarily loaded into volatile memory such as the RAM 108. The RAM 108 is used for storing runtime data variables and other types of data or information. Although specific functions are described for various types of memory, this is merely one example, and a different assignment of functions to types of memory could also be used.

Still images and optionally video images captured by the image capture assembly 200 are stored in persistent memory after. The persistent memory may be one or any combination of the internal persistent memory 120, the removable memory card 132 or remote persistent storage. The remote persistent storage may be a cloud based resource, such as a remote content server, accessible by the wireless network 101 or possibly via a wireline (e.g., via the data port 152) or short-range wireless connection (e.g., via the short-range communication subsystem 162) to a host computer having wireline access to the cloud based resource. The location at which captured still images and optionally video images is stored is typically a configurable setting which may be set by a user either in advance or at the time of capture.

The camera application 181 and/or photo viewer application 183 can access the remote persistent storage and optionally cloud based applications through the wireless network 101 or possibly via a wireline or short-range wireless connection to a host computer having wireline access to the cloud based resource. The use of cloud based or other remote persistent storage allows access to still images and optionally video images captured by the image capture assembly 200 from nearly any computer or portable electronic device having access to the Internet.

The electronic device 100 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the electronic device 100, and the battery interface 136 provides a mechanical and electrical connection for the battery 138. The battery interface 136 is coupled to a regulator (not shown) which provides power V+ to the circuitry of the electronic device 100.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the wireless network 101 through the communication subsystem 104, for example.

The motion sensor 180 may comprise an accelerometer (such as a three-axis accelerometer) or other suitable motion sensor. The orientation sensor 182 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 180 and orientation sensor 182, or parts thereof, may be combined or shared, for example, within an integrated component. The processor 102, or controller (not shown) of a three-axis accelerometer, can convert acceleration measurements into device orientations.

The electronic device 100 may connect to a host personal computer (not shown) via the serial data port 152 or short-range communication subsystem 162 communicating over a suitable interconnection, such as a USB connection, Firewire™ connection, Bluetooth™ connection or the like.

Figure 2:
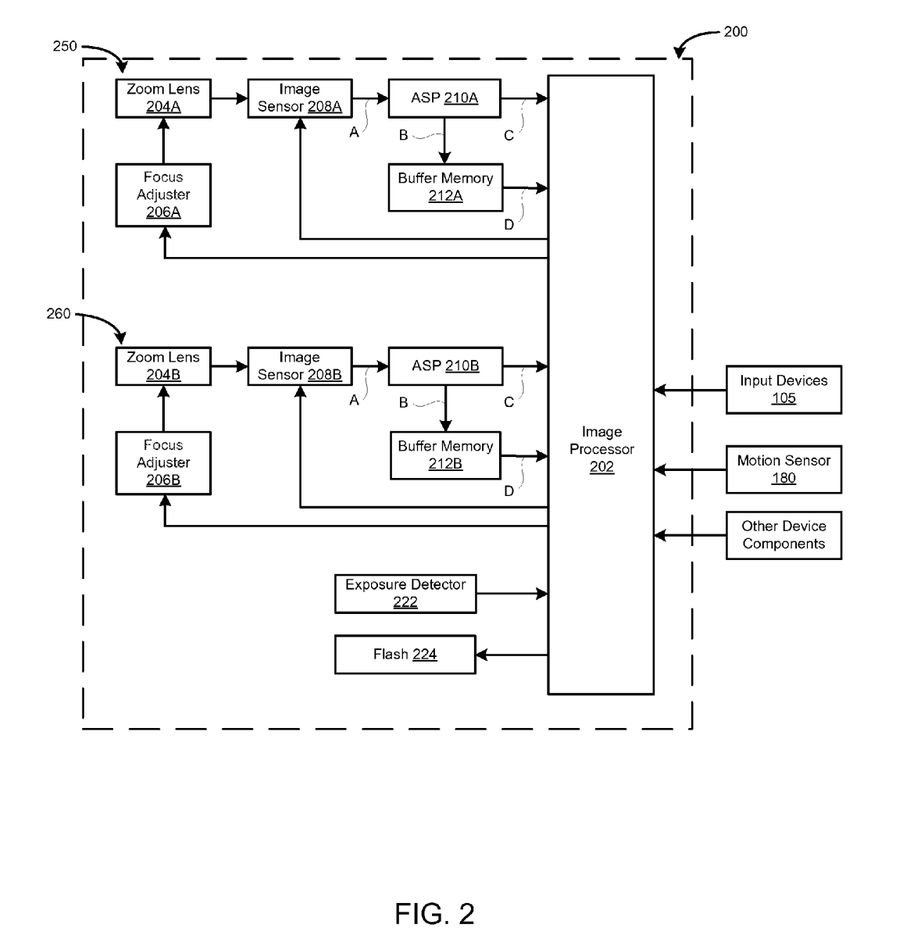
FIG. 2 is a block diagram illustrating an image capture assembly of the portable electronic device of FIG. 1.

Referring now to FIG. 2, the image capture assembly 200 of the electronic device 100 will be described in more detail. The image capture assembly 200 includes an image processor 202 which performs various image processing functions described below. The image processor 202 is typically a programmable image processor but could be, for example, a hard-wired custom integrated circuit (IC) processor, a general purpose microprocessor, or a combination of hard-wired custom IC and programmable processors. When the image capture assembly 200 is part of a multipurpose portable electronic device such as a mobile phone, smartphone or superphone, at least some of the functions of the image capture assembly 200 may be performed by the main processor 102 of the host electronic device 100. It is contemplated that all of the functions performed by the image processor 202 could be performed by the main processor 102, in which case the image processor 202 can be omitted. Furthermore, the image capture assembly 200 has access to various components of the host electronic device 100, and can receive inputs from and send outputs to various components of the host electronic device 100, input such as the input devices 105, motion sensor 180, orientation sensor 182, GPS 184, RAM 108, persistent memory 120 and the like.

The image capture assembly 200 includes two imaging stages A and B, corresponding to a first camera 250 and a second camera 260 with zoom lenses 204A and 204B, respectively. The first zoom lens 204A includes a mechanical assembly of lens elements which is controlled by a first focus adjuster 206A, such as zoom and focus motors (e.g., servo motors), which adjust the focal length and focus distance of light received by the first zoom lens 204A. The second zoom lens 204B is controlled by a second focus adjuster 206B, such as zoom and focus motors (e.g., servo motors), which adjust the focal length and focus distance of light received by the second zoom lens 204B. The first zoom lens 204A and second zoom lens 204B each have a number of focus positions which are controlled by the focus adjusters 206A, 206B. The focus distance may be equated with the focus position in least some examples. The focus adjusters 206A, 206B are coupled to the image processor 202 which sends zoom and focus signals to the adjusters 206A, 206B during zoom and focus operations. The zoom lenses 204A and 204B are located on the same side of the electronic device 100 for focusing on the same or a similar object. In some examples, the zoom lenses 204A, 204B may be part of a stereoscopic (or 3D) image capture assembly in which case the zoom lenses 204A and 204B are mounted side-by-side in a spaced apart relation for stereoscopic image capture such that the zoom lenses 204A and 204B have focus distance ranges which partially or completely overlap. When the image capture assembly 200 is a stereoscopic image capture assembly, the teachings of the present disclosure may be applied when the electronic device 100 is not operating in a stereoscopic (or 3D) mode.

The zoom lenses 204A and 204B may typically have similar or the same optical properties but could have different optical properties. For example, the first zoom lens 204A and the second zoom lens 204B may have similar or different zoom ranges, focus distance ranges, variable apertures, or any other lens characteristics or features.

One or both of the zoom lenses 204A, 204B could be replaced with a fixed focal length lens (also known as a "prime" lens) in alternate embodiments in which case the focus adjuster 206 merely adjusts the focus distance of the lens. When prime lenses are provided, the prime lenses typically have similar or the same optical properties like the zoom lenses 204A, 204B but could have different optical properties. For example, when both zoom lenses 204A, 204B are replaced with prime lenses, one or more of the lenses may be a wide angle lens or a macro lens. Digital zoom may be provided by digital image processing performed by the processor 202 of the image capture assembly 200 or processor 102 (rather than optical zoom provided by the zoom lenses 204A, 204B). In other embodiments, the shutter assembly could be omitted in favour of an electronic shutter. The focal length of the zoom lenses 204A, 204B is expressed by an f-number (sometimes called focal ratio, f-ratio, f-stop, or relative aperture) which is a measure of the diameter of the aperture of the zoom lenses 204A, 204B. In simple terms, the f-number is the focal length divided by the "effective" aperture diameter. The f-number is a dimensionless number that is a quantitative measure of lens "speed".

The zoom lenses 204A, 204B have a variable aperture the size of which is expressed by an f-number (sometimes called focal ratio, f-ratio, f-stop, or relative aperture) which is a measure of the diameter of the aperture of the zoom lenses 204A, 204B. The f-number is the focal length divided by the "effective" aperture diameter. The f-number is a dimensionless number that is a quantitative measure of lens "speed".

The first zoom lens 204A provides light to a first image sensor 208A which generates image data which defines a first image. The second zoom lens 204B provides light to a second image sensor 208B which generates image data which defines a second image. The image sensors 208A and 208B may be the same or different. The image sensors 208A, 208B may have a number of aspect ratios, such as a 4:3 and 16:9 image aspect ratios, and a number of image resolutions. In some embodiments, the image sensors 208A, 208B are charge-coupled devices (CCD) sensor; however, complementary metal-oxide semiconductor (CMOS) sensors or other suitable image sensors could be used. An adjustable aperture and shutter assembly (not shown) in the zoom lenses 204A, 204B is used to control the aperture size and the exposure time of the image sensors 208A, 208B.

The focus adjuster 206A, image sensor 208A, ASP 210A and buffer memory 212A associated with the first zoom lens 204A may be different than the focus adjuster 206B, image sensor 208B, ASP 210B and buffer memory 212B associated with the second zoom lens 204B. In some examples, the first zoom lens 204A may be considered a primary lens and the second zoom lens 204B may be considered a secondary lens. In such examples, the image sensor 208B associated with the second zoom lens 204B may be a different size, have a higher or lower resolution, or may not include colour sensors. In some examples, the buffer memory 212B associated with the second zoom lens 204B may be larger or smaller than the buffer memory 212A associated with the first zoom lens 204A.

The image processor 202 controls the image sensors 208A, 208B by supplying various control signals to the image sensors 208A, 208B. The image processor 202 also controls the focus adjusters 206A, 206B, an exposure detector 222 which determines the amount of available light, and a flash which emits light to illuminate a scene being captured by the zoom lenses 204. The input devices 105 provide user controls which can control the operation of the image capture assembly 200. The image processor 202 can use the input from the exposure detector 222 to determine the exposure time required to capture an image using the image sensors 208A, 208B based on the amount of available light and other settings. The image processor 202 can activate the flash 224 to increase the amount of available light, for example, in response to the input from the exposure detector 222.

An analog captured image signal A output from the image sensors 208A, 208B is amplified and converted to a digital captured image signal by first and second analog signal processors (ASP) 210A and 210B, respectively. The ASPs 210A, 210B each include an analog-to-digital (A/D) converter among other functional components. A digital captured image signal B output by the ASPs 210A, 210B is temporarily stored in a first buffer memory 212A or second buffer memory 212B, respectively. The buffer memories 212A, 212B may be a Dynamic random-access memory (DRAM) buffer memory in some embodiments. While separate buffer memories 212A, 212B have been described, it is contemplated that a single, shared buffer memory may be used in other embodiments.

The example illustrated in FIG. 2 shows a single image processor 202 which controls both image sensors 208A, 208B and lenses 204A, 204B. In other examples, distinct image processors may be used. In these examples, it will be appreciated that the functions performed by the image processor 202 as described herein may be performed by one or both of the distinct image processors. The two image processors may communicate with each other directly, via the processor 102 or through other means. In some examples, the functions performed by one or more of the distinct image processors described herein may be performed by the processor 102. In such examples, one or more of the image processors may be omitted. In some examples, the image sensors 208 may share an ASP 210. In such examples, the additional ASP may be omitted.

The image processor 202 produces focus signals which drive the focus adjusters 206A, 206B (e.g., zoom and focus motors) to adjust the focus of an image providing the image sensor output for the captured image signal, typically in response to the activation of the capture button.

A passive autofocus system is typically provided by the electronic device 100. In the passive autofocus system, a digital captured image signal C output by the ASPs 210A, 210B is provided to the image processor 202 which performs autofocus calculations on the digital captured image signal C. Based on the output the autofocus calculations, as necessary, focus signals are sent to the focus adjusters 206A and/or 206B to adjust a focus position of the zoom lens 204A and/or 204B, thereby adjusting the focus distance of the zoom lenses as required. The autofocus calculations are typically performed using either contrast detection or phase detection methods which rely on moving the lens 204A and/or 204B to make minor adjustments in the focus distance until a maximal (or optimal) contrast is obtained. The autofocus calculations assume that maximal (or optimal) contrast corresponds to maximal sharpness. The nature of the autofocus calculations is outside the scope of the present disclosure and will not be described in further detail herein. Aspects of the autofocus system and methods are further described herein.

The image processor 202 may continuously produce focus signals thereby providing continuous autofocus when the image capture assembly 200 is in an active or ready-to-capture state (rather than an inactive state such as when displaying a full screen menu) such that the images being stored to the buffer memory 212A, 212B are focused images rather than performing autofocus operations in response to the activation of the capture button as mentioned previously.

In other embodiments, an active autofocus system could be used instead of the passive autofocus system described above. The active autofocus system may include an infrared (IR) emitter and IR sensor which determines a distance from the IR emitter to an object at the focus point using the time for reflected IR waves to return to the IR sensor and/or the intensity of the reflected IR waves. The focus adjusters 206A, 206B move a respective one of the zoom lenses 204 in accordance with the determined distance.

The digital captured image signal C may also be output to the display 112 to provide a preview image, typically for the primary lens. The digital captured image signal C may be used to provide a real-time or "live" preview in which a real-time image (or an approximation of an image) of the image captured with the first image sensor 208A is displayed on the display 112 as a thumbnail image (e.g., reduced size/resolution version) of the captured image for graphical processing efficiency, or alternatively a dedicated electronic viewfinder device.

A digital captured image signal D provided by the buffer memories 212A, 212B is subsequently processed by the image processor 202 to produce a processed digital image file, which may contain a still digital image or a video image.

The buffer memories 212A, 212B may also be used to eliminate shutter lag in what is sometimes referred to as a "zero" shutter lag mode. A sequence of images acquired from the digital captured image signal B of the ASPs 210A, 210B are stored by the ASPs 210A, 210B in the buffer memories 212A, 212B by the ASPs 210A, 210B in a chronological order of a time at which the images were captured. The images are typically stored in association with a date and/or time at which the images were captured to assist subsequent retrieval and/or processing, e.g. for accessing and retrieval of images based on the chronological order. When in a zero shutter lag mode, images are continuously sampled and stored to the buffer memories 212A, 212B up to a set limit. The limit of each buffer memory 212 is typically a number of images, e.g., 1, 2, 3, 4, 5, 10, 25 or other suitable number which depends on a frame rate the image sensor 208 (the number of frames per second (fps)) captured by the image sensor 208) and other factors. The limit of each buffer memory 212 could be another suitable limit such as a total size of the image or a duration of capture (e.g., all images take in the last n number of seconds). The limit of each buffer memory 212 may be configurable in some embodiments. The limit is set so that the captured images stored in each buffer memory 212 are generally contemporaneous with the real-time preview image. Accordingly, the limit of each buffer memory 212 depends largely on the frame rate.

Alternatively, rather than storing a sequence of images acquired from the digital captured image signal B of the ASPs 210A, 210B in the buffer memories 212A, 212B, a sequence of processed images in the formed of processed digital image files could be stored by the image processor 202 in the buffer memories 212A, 212B.

While zero shutter lag has been described with respect to both image sensors 208 and buffer memories 212, it will be appreciated that zero shutter lag may be implemented with respect to only one of the image sensors 208 and buffer memories 212, typically for the primary lens.

The zero shutter lag mode differs from a continuous capture mode in that the images are only temporarily stored in a buffer memory 212 and that the sampling is continuous rather than being dependent on the activation of the capture button. In the zero shutter lag mode, the capture button is the trigger for changing the storage of the captured images from temporary storage in a buffer memory 212 to persistent storage in the memory 120 or removable memory card 132.

The real-time image displayed on the display 112 is synchronized with the images stored in a buffer memory 212, typically the buffer memory 112A corresponding to the primary lens (i.e., the first zoom lens 204A), such that when the capture button is activated, the image in the buffer memory 212 which corresponds to the real-time image displayed on the display 112 when the capture button was activated is selected from the buffer memory 212 for further processing by the image processor 202, and is stored in persistent memory such as the persistent memory 120 or the removeable memory card 132. In this manner, the image displayed to the user corresponds to the image captured by the image capture assembly 200, thereby providing no shutter lag.

The image processor 202 may perform various other image processing functions, including colour interpolation and colour and tone correction to produce rendered image data, such as standard Red Green Blue (sRGB) image data. The rendered image data is then stored in the memory of the removeable memory card 132 or persistent memory 120. In some embodiments, the rendered image data may be compressed before storing, for example, the rendered image data may be JPEG compressed and stored as a JPEG image file, which may be in the Exchangeable image file (Exif) format or other suitable format which preferably supports image metadata, such as one or more of a date/time the image was captured, f-number of the first lens 204 at which the image was captured, GPS location and pointing direction when the image was captured and possibly other camera settings.

The processing performed by the image processor 202 is typically controlled by firmware stored in a firmware memory (not shown), which may be flash memory or any other suitable form of memory. The image processor 202 processes the digital input image from the buffer memory 212, using RAM memory (such as RAM 108 of the host electronic device or possibly separate, dedicated RAM) to store intermediate results during processing.

While the components of the electronic device 100 are shown as separate blocks in FIGS. 1 and 2, the functions of various components may be combined in actual processing elements, circuits and the like. Furthermore, some of the functional blocks of FIGS. 1 and 2 may be separated into one or more sub blocks when implemented in actual processing elements, circuits and the like.

Figure 3:
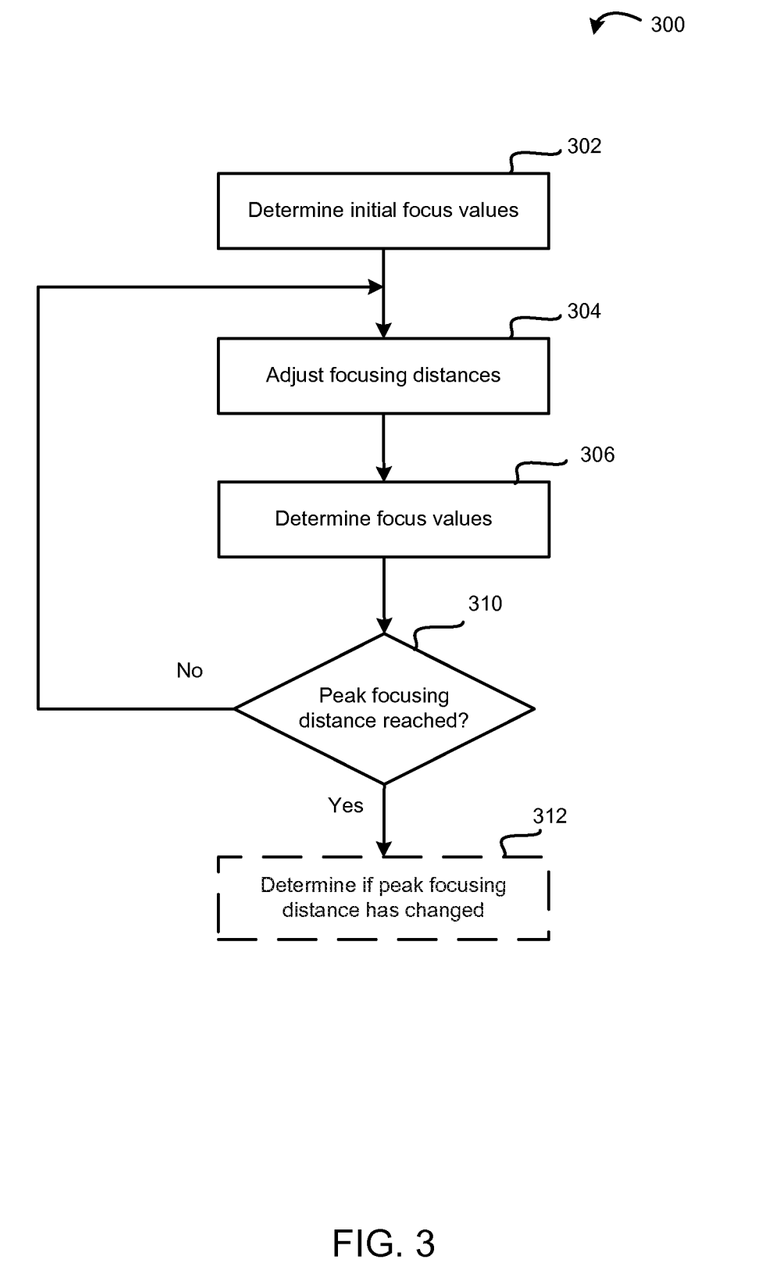
FIG. 3 is a flowchart of a method for autofocusing in accordance with one example embodiment of the present disclosure.

FIG. 3 is a flowchart of a method 300 for autofocusing in accordance with one example embodiment of the present disclosure. The method 300 or any other method described herein may be carried out, at least in part, by firmware or software such as the camera application 181, executed by the processor 102 and/or image processor 202. Coding of software for carrying out the method 300 is within the scope of a person of ordinary skill in the art provided the present disclosure. The method described herein may contain additional or fewer processes than shown and/or described, and may be performed in a different order. Computer-readable code executable by the processor 102 and/or image processor 202 to perform the method described herein may be stored in a computer-readable medium such as the persistent memory 120.

At block 302, the electronic device 100 determines initial focus values from image data provided by the first zoom lens 204A or second zoom lens 204B. This may occur, for example, in response to engaging a camera mode of the electronic device 100 which activates the image capture assembly 200. The camera mode can be activated by a camera button or a corresponding menu option displayed on the display 112. In some examples, a passive autofocus system determines initial focusing values in the form of contrast or phase values at a particular focus point. In some examples, the focus point is a portion of the image received by the image sensor 208A or 208B upon which the image processor 202 is performing autofocus operations. In some examples, the focus point may represent an object or region within the image which should be in focus (e.g., which should appear sharply detailed). In some examples, the focus point may represent an object at a particular distance or range such that all objects at that particular distance or with that particular range are in focus. Methods for selecting a focus point are well known in the art and will be readily known to the skilled person.

Figure 4:
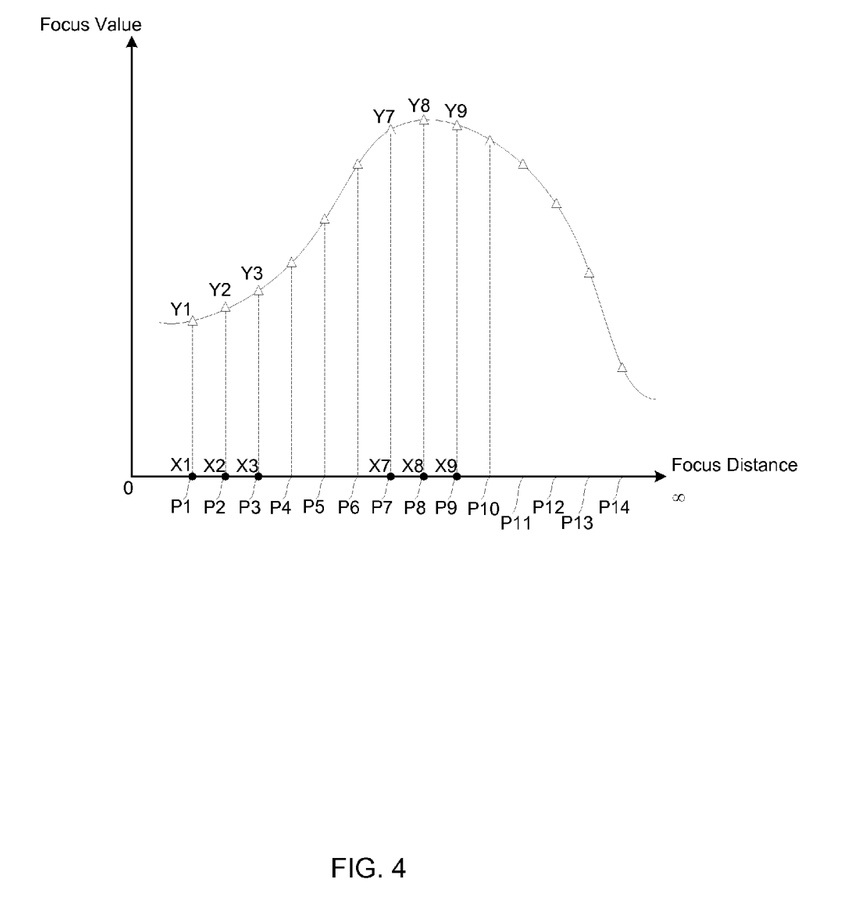
FIG. 4 is a graph illustrating an example relationship between the focus value at a focus point in an image and the focus distance of a lens.

FIG. 4 shows an example curve of focus values at a particular focus point as the focus distance of a lens, such as the first zoom lens 204A or second zoom lens 204B, is changed. In the example shown in FIG. 4, the focus values are contrast values wherein a higher contrast value corresponds to a focus point which is sharper and more in focus. In other examples, the focus values may be phase values or any other value for comparing focus levels. The focus distance axis ranges from zero to infinity. The scale of this example focus distance axis may be linear, logarithmic, or any other suitable scale.

The first and second lenses have similar focus positions (P1 through P14) in the shown example. Each focus position corresponds to a focus distance. For example, at focus position P1, the lens has a focus distance of X1 which for a particular focus point corresponds to a focus value of Y1.

Referring back to FIG. 3, in some examples, the first zoom lens 204A and second zoom lens 204B are positioned such that their corresponding focus distances are different in the initial state at 302. For example, if 20 focus positions are available, noted as P1, P2 . . . P20, the first zoom lens 204A (such as the primary lens used to capture the image) is at focus position P12, the second zoom lens 204B may be at focus position P15 whereas the peak focus position (i.e., best focus position) may be at focus position P8.

The focus distances of the first zoom lens 204A and second zoom lens 204B, in at least some examples, are adjacent. The adjacent focus distances may immediately adjacent, i.e. one focus position apart. For example, if the first zoom lens 204A is initially positioned at focus position P2 and the second zoom lens 204B is initially positioned at focus position P3, the focus distance of the first lens is X2 which is adjacent to the focus distance of the second lens X3. Alternatively, the adjacent focus distances of the first zoom lens 204A and second zoom lens 204B may be several focus positions apart.

At 302, the processor 102 and/or image processor 202 determines that the initial focus value of the first zoom lens 204A is Y2 and that the initial focus value of the second zoom lens 204B is Y3.

At 304, the image processor 202 controls the focus adjusters 206A, 206B to adjust the lens position of at least one of the first zoom lens 204A and the second zoom lens 204B, thereby adjusting the focus distance of the lens(es). As part of the adjusting, the focus distance of the first zoom lens 204A and/or second zoom lens 204B may be increased or decreased by moving the position of the first zoom lens 204A and/or second zoom lens 204B relative to the first image sensor 208A and/or second image sensor 208B. It will be appreciated that the focus distance of one of the first zoom lens 204A and/or second zoom lens 204B may be increased while the focus distance of the other of the first zoom lens 204A and/or second zoom lens 204B is decreased so that the focus positions of the first zoom lens 204A and second zoom lens 204B converge during autofocus operations. The focus distance of the first lens and the second lens are typically maintained at different focus distances during the autofocusing cycle to avoid overlapping focus values.

When the first zoom lens 204A and second zoom lens 204B are at different focus distances in the first iteration of block 304, the likelihood of adjusting the focus distance in the wrong direction may be reduced or eliminated, particularly when the first zoom lens 204A and second zoom lens 204B are immediately maintaining at adjacent focus distances. By comparing the focus values of the first zoom lens 204A and second zoom lens 204B at the different (e.g., adjacent) focus distances, the processor 102 and/or image processor 202 can determine which direction to initially adjust the focus distances. In the previously mentioned example in which the first lens 204A is at P2 and the second lens 204B is at P3, in the example focus value curve in FIG. 4, the processor 102 and/or image processor 202 can determine that the focus distance X3 of the second zoom lens 204B has a greater focus value Y3 then the focus value Y2 of the focus distance X2 of the first zoom lens 204A. Since the second zoom lens 204B lens has a greater focus distance (i.e., closer to infinity), the electronic device 100 can determine that the next focus distance adjustment should be towards infinity.

Similarly, in another example (with a different focus value curve than FIG. 4), if the first zoom lens 204A, at position P2 has a higher focus value than the second zoom lens 204B, at position P3, the device 100 would determine that the next focus distance adjustment should towards zero.

In this manner, in some examples, maintaining the second zoom lens 204B at a position with an adjacent focus distance to that of the first zoom lens 204A may eliminate an initial focus direction hunt compared with single lens autofocus systems. For example, in a camera with only a single lens which is positioned at P2, without additional information, the camera would not be able to immediately determine in which direction to initially adjust the focus distance. In some instances, the camera may initially move the lens position to P1 before determining that the focus value Y1 is less than the focus value Y2 at the previous position. The camera will then backtrack to P3. This extra focusing position adjustment takes more time, causes additional wear on the focus system, and increases the power usage caused by the extra lens adjustment and associated calculations. The multi-lens examples described herein seek to reduce or eliminate unnecessary focus steps, thereby increasing the image capture rate while reducing wear and saving power and processing cycles.

Referring again to FIG. 3, as mentioned previously, at 304 the image processor 202 controls the focus adjuster 206 to adjust the lens position of at least one of the first zoom lens 204A and the second zoom lens 204B thereby adjusting the focus distance of the lens(es). At 306, new focus values of the adjusted lens(es) are determined similar to the determination in 304.

At 310, the device 100 determines whether the peak focus distance has been reached. When the peak focus distance has not been reached, the method continues at 304 in an iterative manner until the peak focus distance is reached or the method 300 is interrupted. It will be appreciated that determining the first focus value, determining the second focus value, determining whether the focus distance of the first zoom lens 204A or the focus distance of the second zoom lens 204B corresponds to the peak focus position, and adjusting the focus distance of the first zoom lens 204A and second zoom lens 204B define an autofocus cycle. The autofocus cycle is repeated for the adjusted focus distance of the first zoom lens 204A and second zoom lens 204B until the focus distance of the first zoom lens 204A or the focus distance of the second zoom lens 204B corresponds to the peak focus position.

In accordance with some examples, the focus distances of the first zoom lens 204A and second zoom lens 204B are adjusted in tandem (i.e., concurrently). For example, if the first zoom lens 204A is at position P2 and the second zoom lens 204B is at position P3, at 304, the first zoom lens 204A may be adjusted to P3 and the second zoom lens 204B may be adjusted to P4, thereby moving in tandem and maintaining the first zoom lens 204A and second lens zoom lens 204B at different focus distances, namely adjacent focus distances.

In a single lens autofocus system, the camera may not be able to determine that the lens has reached a peak focus point until the peak is overshot. For example, with reference to the example focus value curve in FIG. 4, a single lens which starts at P2 is adjusted incrementally from P2 to P3 to P4 and so on. The single lens camera continues determining that the respective focus values Y2, Y3, Y4 continue to increase from the previous values indicating that the focus point is moving more into focus. However, the single lens camera may not be able to determine that at position P8, the focal value Y8 is a peak focus value until the single lens is moved to position P9 and determines that the focus value Y9 is less than the focus value Y8 of the previous position. Upon determining this, the single lens backtracks to position P8 which has been determined to be the peak focus position. This extra focusing position adjustment takes more time, causes additional wear on the focus system, and increases the power usage caused by the extra lens adjustment and associated calculations. The multi-lens examples described herein seek to reduce or eliminate unnecessary focus steps, thereby increasing the image capture rate while reducing wear and saving power and processing cycles.

In some examples, moving the first zoom lens 204A and second zoom lens 204B in tandem may eliminate overshooting the peak focus position. For example, in the example focus value graph in FIG. 4, and with the first zoom lens 204A at P2 and the second zoom lens 204B at P3, the second zoom lens 204B is adjusted P3→P4→P5 and the first zoom lens 204A is adjusted in tandem P2→P3→P4 and so on until the position P9 is reached by the second zoom lens 204B. At this position, the first zoom lens 204A is at the peak focus distance p8, one focus position below the position P9. The processor 102 and/or image processor 202 determines, at 310, that the peak focus distance has been found by determining that the focus value Y9 at the P9 position of the second zoom lens 204B is lower than the focus value Y8 at the P8 position of the first zoom lens 204A. Since the first zoom lens 204A is already at the peak focus position P8 (with peak focus distance X8), no additional backtracking or focus distance adjustment is required.

In the above example, both the moving the first zoom lens 204A and second zoom lens 204B are positioned at a focus position below the peak focus distance. However, overshooting the peak focus position may be achieved when the first zoom lens 204A and second zoom lens 204B are in other relative focus positions. For example, in the example focus value graph in FIG. 4, and with the second zoom lens 204B at P9 and the first zoom lens 204A at P6, the second zoom lens 204B is adjusted P9→P8→P7 and the first lens is adjusted in tandem P6→P7→P8. The processor 102 and/or image processor 202 determines, at 310, that the peak focus distance has been found by determining that the focus value Y7 at the P7 position of the second zoom lens 204B is lower than the focus value Y8 at the P8 position of the first zoom lens 204A. Since the first zoom lens 204A is already at the peak focus position P8 (with peak focus distance X8), no additional backtracking or focus distance adjustment is required.

In some examples, the first zoom lens 204A is a primary lens and the second zoom lens 204B is a secondary lens. In some examples, the primary lens is a higher quality lens better suited for capturing images due to its optical properties, the image sensor associated with the primary lens, or other factors. In some examples, the secondary lens is a lower quality lens configured to provide a supportive role in the autofocus system rather than image capture. Other aspects of the second camera 260 may be similarly reduced in quality when the configured to provide a supportive role in the autofocus system. In some of these examples, by adjusting the focus distances such that the secondary lens leads the primary lens in the iterative focus distance adjustment process, the primary lens will be at the peak focus distance when the peak focus value is found. This may eliminate instances when the primary lens leads the secondary lens, and the secondary lens ends up at the peak focus distance when the peak focus value is found.

In accordance with some examples, when the initial focus positions are typically immediately adjacent, i.e. the first zoom lens 204A is initially at focus position P2 and the second zoom lens 204B is initially at focus position P3 shown in FIG. 4, each lens 204A, 204B has moved by an increment of two focus positions rather than one focus position. At the first occurrence of block 304, the first zoom lens 204A is moved from P2 to P4 and the second zoom lens 204B is moved from P3 to P5. This process is repeated until the peak focus position is reached. In the present example, the first zoom lens 204A would be moved from P2→P4→P6→P8 and the second zoom lens 204B would be moved from P3→P5→P7→P9 until the peak focus position is reached. Alternatively, in other examples the initial focus positions of the first zoom lens 204A and second zoom lens 204B may be odd and even positions while not being immediately adjacent.

In some examples, by adjusting the focus distances by increments of two, the peak focus position may be reached twice as quickly as a single lens autofocus system in which the lens must move at single increments or risk missing a peak focus position. In some examples, adjusting the focus distances by increments of two in this alternating pattern decreases the focusing time.

In some examples, adjusting the focus distances by increments of two may cause both lenses to overshoot the peak focus position; however, the time gained by moving the lenses twice as quickly will often offset the time required to correct an overshot.

Referring again to FIG. 3, once the peak focus distance has been reached, at optional block 312, the device may determine if the peak focus distance has changed, for example, because the distance to the object which is the subject of the focus operations has moved away from or towards the electronic device 100.

In some example, the first zoom lens 204A remains at the peak focusing position while the second zoom lens 204B is sequentially adjusted to each of the neighbouring focus distances. The neighbouring focus distances are the focus distances which are immediately shorter and longer than the focus distance at the peak focusing position. For example, with reference to the example focus value graph in FIG. 4, if the first zoom lens 204A is at focus position P8, the second zoom lens 204B is moved to neighbouring focus distances at P7 and P9. The device 100 determines the focus values Y7, Y9 at each of the neighbouring focus positions and determines whether the peak focus distance has changed. If the focus values Y7, Y9 at either of the neighbouring focus positions are greater than the current peak focus value Y8, the peak focus distance has changed, and the device 100 may restart the method 300 at 304. If the focus values Y7, Y9 at both of the neighbouring focus positions are not greater than the current peak focus value Y8, the peak focus distance has not changed.

In some examples, by using the second lens to check the neighbouring focus values, the autofocus system can check whether a peak focus distance has changed while the first lens maintains a stable focus. In some examples, this can avoid unnecessary focus hunting when no change is actually necessary. This may occur, for example, because the scene brightness changes or the subject of the image being composed changes but the distance to the object in being focussed does not change.

When the first zoom lens 204A or second zoom lens 204B corresponds to the peak focus position, the electronic device 100 may capture one or more images (not shown) and stored them in memory. The images may be still images or possibly video images. When the first zoom lens 204A is a primary lens and the second zoom lens 204B is a secondary lens, the images are captured by the primary lens after being adjusted to the peak focus position.

The multi-lens device and method for autofocusing described above seems to provide improved autofocus by reducing or eliminating autofocus hunting, providing steadier image focus, and/or providing faster focusing compared with single-lens devices in various instances.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the various methods of the present disclosure have been described in terms of functions shown as separate blocks in the Figures, the functions of the various blocks may be combined during processing on an electronic device. Furthermore, some of the functional blocks in the Figures may be separated into one or more sub steps during processing on an electronic device.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A method for autofocusing on a portable electronic device, the method comprising:
   determining a first focus value from image data captured by a first image sensor associated with a first lens;
   determining a second focus value from image data captured by a second image sensor associated with a second lens;
   determining from the first focus value and second focus value whether a focus distance of the first lens or a focus distance of the second lens corresponds to a peak focus position; and
   when neither the focus distance of the first lens nor the focus distance of the second lens corresponds to the peak focus position, comparing the first focus value with the second focus value to determine a direction in which to adjust the focus distance of the first lens and the focus distance of the second lens, and adjusting the focus distance of the first lens and the focus distance of the second lens according to the determined directions.

2. The method of claim 1, wherein determining the first focus value, determining the second focus value, determining whether the focus distance of the first lens or the focus distance of the second lens corresponds to the peak focus position, and adjusting the focus distance of the first lens and second lens define an autofocus cycle, the method further comprising repeating the autofocus cycle for the adjusted focus distance of the first lens and second lens until the focus distance of at least one of the first lens and the second lens corresponds to the peak focus position.

3. The method of claim 1, further comprising:
   capturing an image using the first lens or second lens when at the peak focus position.

4. The method of claim 1, wherein the first lens is a primary lens and the second lens is a secondary lens, wherein the focus position of the second lens leads the focus position of the first lens.

5. The method of claim 1, wherein the focus distances of the first and second lenses are adjusted in tandem.

6. The method of claim 1, wherein the focus distance of the first lens and the second lens are at adjacent focus distances during an initial autofocus cycle.

7. The method of claim 6, wherein the focus distances of the first and second lenses are each adjusted by two positions.

8. The method of claim 1, wherein the focus distance of the first lens and the second lens are maintained at different focus distances.

9. The method of claim 8, wherein the focus distance of the first lens and the second lens are maintained at adjacent focus distances.

10. The method of claim 1, further comprising:
    when the focus distance of the first lens corresponds to the peak focus position, determining whether the peak focus position has changed using the second lens.

11. The method of claim 10, wherein determining whether the peak focus position has changed comprises:
    adjusting the focus distance of the second lens to one or more focus distances neighbouring the peak focus position of the first lens; and
    determining, at each neighbouring position, a focus value from image data captured by the image sensor associated with the second lens.

12. An electronic device, comprising:
    a first lens and a first focus adjuster for adjusting a focus distance of the first lens;
    a second lens and second focus adjuster for adjusting a focus distance of the second lens;
    at least one image sensor for detecting light received from the first and the second lenses; and
    a processor coupled to the at least one image sensor and the first and second focus adjusters, the processor configured to:
       determine a first focus value from image data captured by the at least one image sensor associated with the first lens;
       determine a second focus value from image data captured by the at least one image sensor associated with the second lens;
       determine from the first focus value and second focus value whether a focus distance of the first lens or a focus distance of the second lens corresponds to a peak focus position; and
       when neither the focus distance of the first lens nor the focus distance of the second lens corresponds to the peak focus position, compare the first focus value with the second focus value to determine a direction in which to adjust the focus distance of the first lens and the focus distance of the second lens, and adjust the focus distance of the first lens and the focus distance of the second lens by actuating by actuating the first focus adjuster and the second focus adjuster according to the determined directions.

13. The device of claim 12, wherein the processor being configured to determine the first focus value, determine the second focus value, determine whether the focus distance of the first lens or the focus distance of the second lens corresponds to the peak focus position, and adjust the focus distance of the first lens and second lens comprises an autofocus cycle, the processor further being configured to repeat the autofocus cycle for the adjusted focus distance of the first lens and second lens until the focus distance of the first lens or the focus distance of the second lens corresponds to the peak focus position.

14. The device of claim 12, wherein the processor is configured to capture an image using the first lens or second lens when at the peak focus position.

15. The device of claim 12, wherein the first lens is a primary lens and the second lens is a secondary lens, wherein the focus position of the second lens leads the focus position of the first lens.

16. The device of claim 12, wherein the focus distance of the first lens and the second lens are at adjacent focus distances during an initial autofocus cycle and the focus distances of the first and second lenses are each adjusted by two positions.

17. The device of claim 12, wherein the processor is configured to determine whether the peak focus position has changed using the second lens when the focus distance of the first lens corresponds to the peak focus position.

18. The device of claim 17, wherein the processor is configured to determine whether the peak focus position has changed by adjusting the focus distance of the second lens to one or more focus distances neighbouring the peak focus position of the first lens, and determining, at each neighbouring position, a focus value from image data captured by the image sensor associated with the second lens.

19. A method for autofocusing on a portable electronic device, the method comprising:
   determining a first focus value from image data captured by a first image sensor associated with a first lens;
   determining a second focus value from image data captured by a second image sensor associated with a second lens;
   determining, by comparing the first focus value and second focus value, whether a focus distance of the first lens or a focus distance of the second lens corresponds to a peak focus distance; and
   adjusting the focus distances of the first lens and second lens when neither the focus distance of the first lens nor the focus distance of the second lens corresponds to the peak focus distance, the adjusting comprising:
      moving the first lens and the second lens to predefined focus positions having respective focus distances, the first lens and the second lens being maintained at adjacent focus positions, the first lens and the second lens being moved in a same direction of movement.

20. The method of claim 19, wherein the first lens is a primary lens and the second lens is a secondary lens, wherein the second lens is ahead of the first lens in the direction of movement.

* * * * *